United States Patent [19]
Kodama

[11] Patent Number: 5,179,477
[45] Date of Patent: Jan. 12, 1993

[54] VIDEO TAPE RECORDER

[75] Inventor: Masafumi Kodama, Kyoto, Japan

[73] Assignee: Mitsubishi Denki Kabushiki, Tokyo, Japan

[21] Appl. No.: 459,307

[22] Filed: Dec. 29, 1989

[30] Foreign Application Priority Data

Jan. 21, 1989 [JP] Japan .................. 1-12962
Jan. 21, 1989 [JP] Japan .................. 1-12963
Feb. 1, 1989 [JP] Japan .................. 1-24345

[51] Int. Cl.⁵ .................. H04N 5/78; H04N 5/95
[52] U.S. Cl. .................. 360/33.1; 360/37.1; 358/338
[58] Field of Search .............. 360/37.1, 33.1, 92.3, 360/9.1, 10.1, 10.3, 337, 338; 358/314

[56] References Cited

U.S. PATENT DOCUMENTS

| | | | |
|---|---|---|---|
| 4,445,145 | 4/1984 | Moriya | 360/10.2 |
| 4,802,032 | 1/1989 | Tatsuzawa et al. | 360/37.1 |
| 4,878,131 | 10/1989 | Sakata et al. | 360/37.1 |

FOREIGN PATENT DOCUMENTS 57-80880  5/1982  Japan .

Primary Examiner—Aristotelis Psitos
Assistant Examiner—Varsha V. Sheladia

[57] ABSTRACT

An improved helical scan type video tape recorder for reproducing a high quality video signal with no distortions, thereby a sag distortion is eliminated by applying a continuous reproduced video signal prepared by inserting FM signals reproduced by a pair of rotary heads into no-signal field intervals of a FM signal reproduced by a single rotary head, only the FM signal from which is used for displaying, to a clamp circuit, a skew distortion is eliminated by providing one horizontal scanning period of 1H between the last horizontal pulse in a signal field interval and the first horizontal pulse in a no-signal field interval of a reproduced video signal regardless of a type of scanning such as an interlace scanning for causing no disturbance in horizontal synchronization, and a phase distortion is eliminated by combining a pseudo-vertical synchronizing signal, which has a specific phase relationship with a video tape phase standard signal at any traveling speed of the video tape, with a reproduced video signal for causing no disturbance in vertical synchronization.

1 Claim, 15 Drawing Sheets

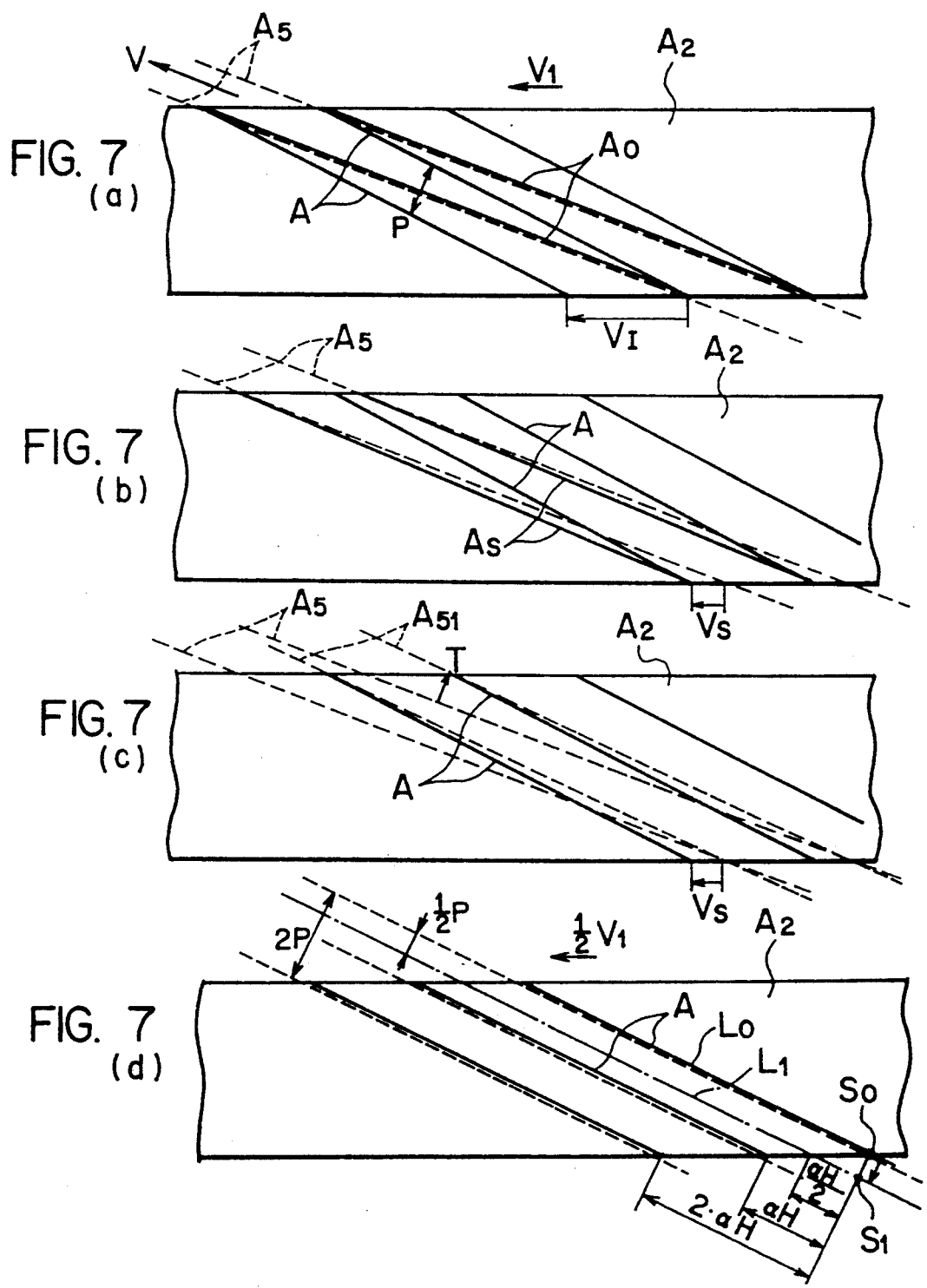

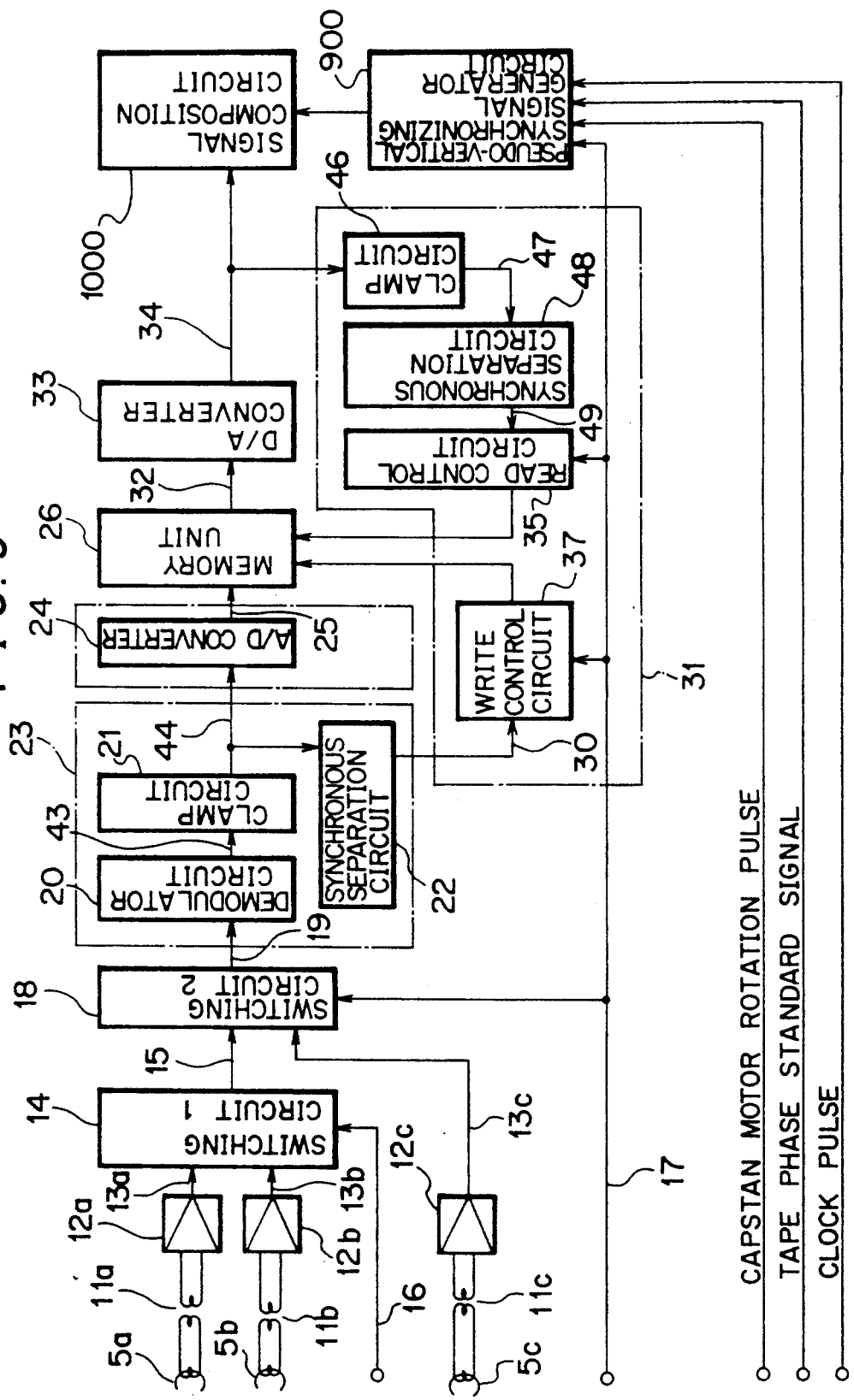

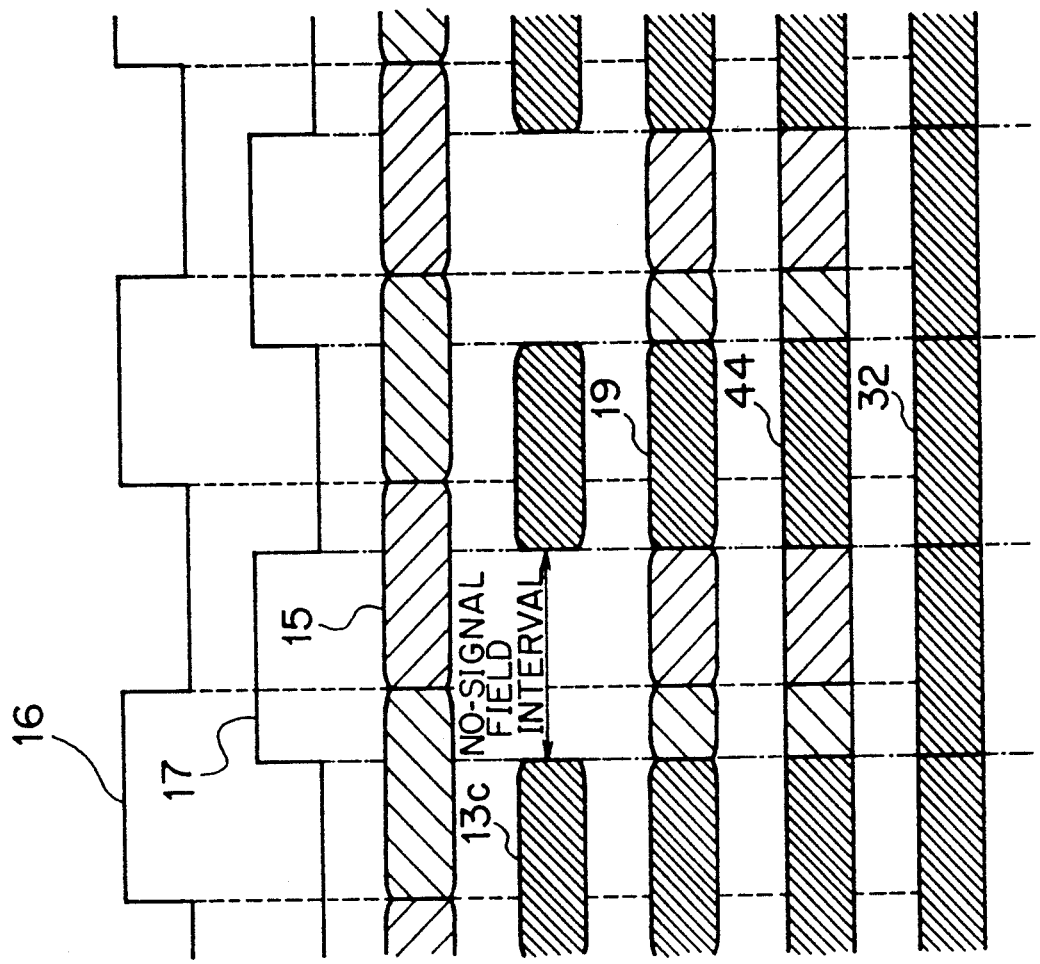

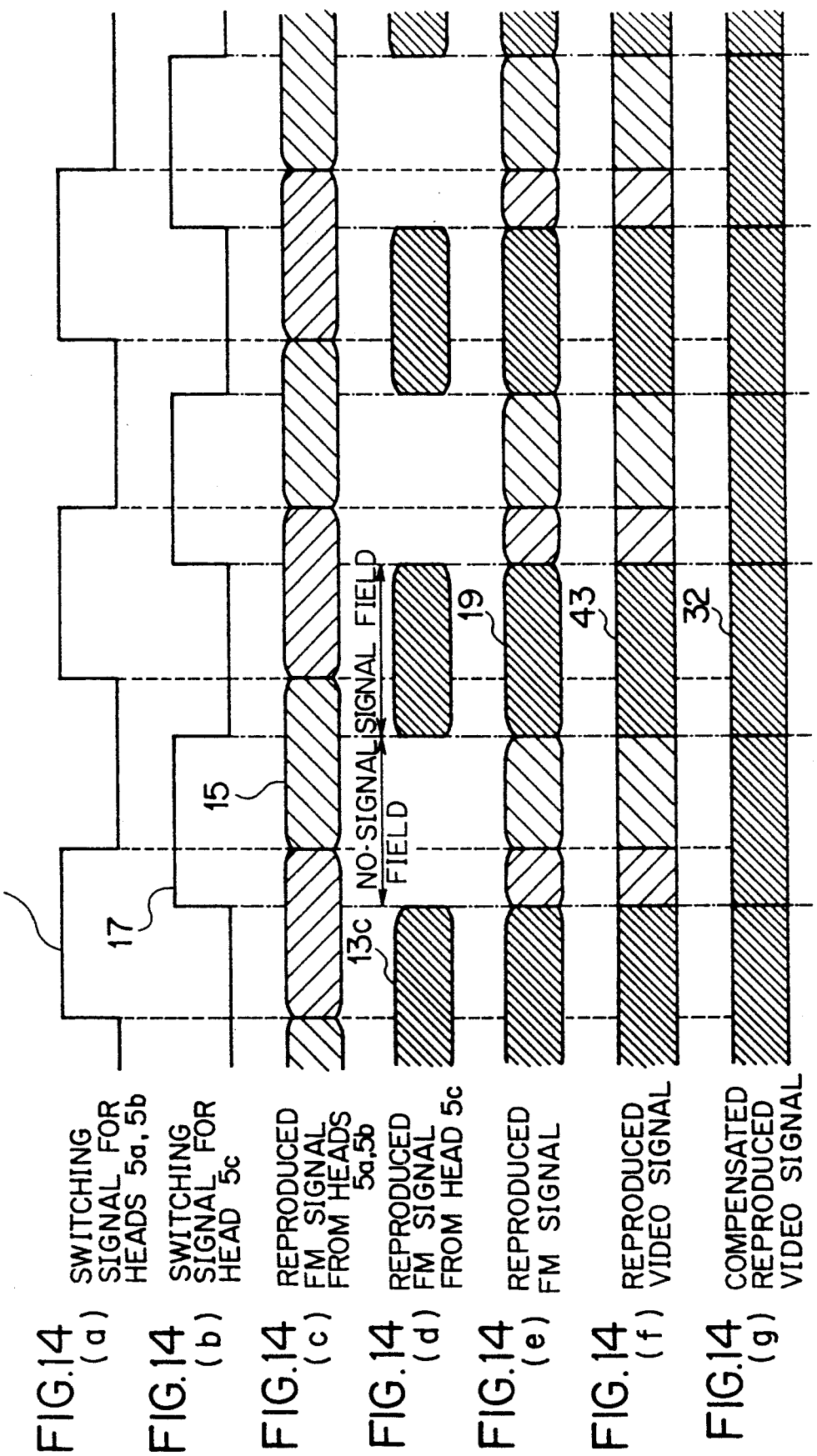

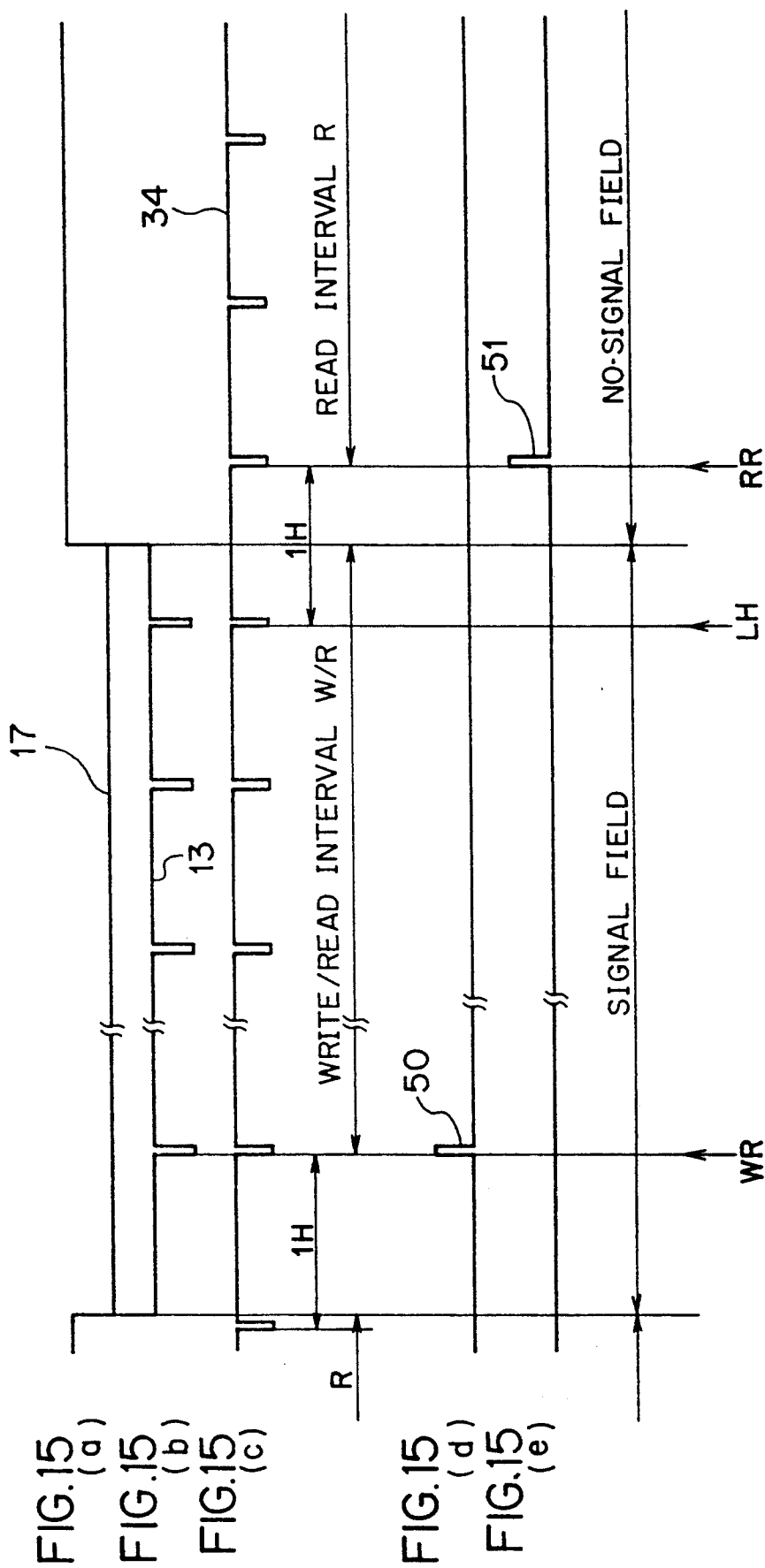

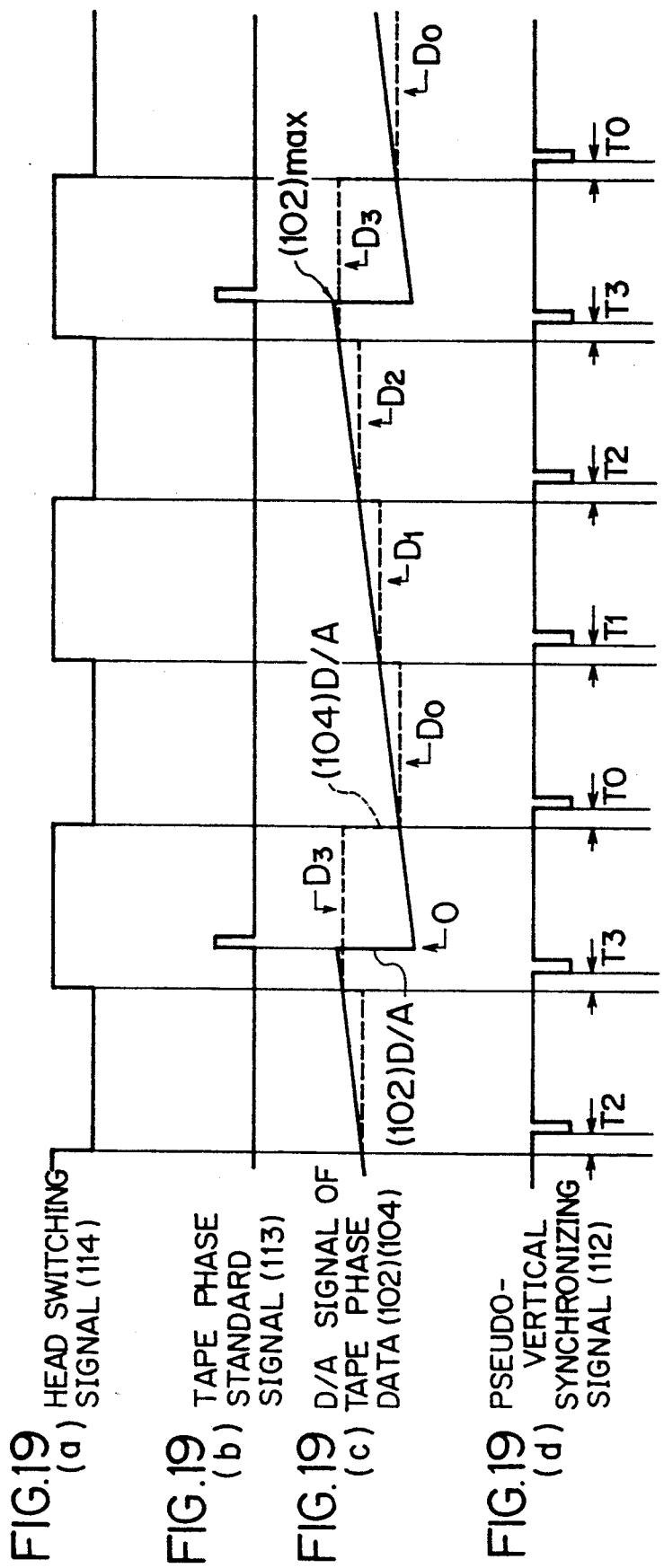

VIDEO TAPE RECORDER

BACKGROUND OF THE INVENTION

1. Field of the Invention

The present invention relates to a helical scan type video tape recorder (hereinafter called VTR), and more particularly, to a VTR wherein a sag distortion, a skew distortion and a phase distortion are eliminated from a reproduced video signal, thereby providing an improved picture quality.

2. Description of the Prior Art

Heretofore, a sag distortion has been encountered in a reproduction of video signal by a signal head VTR. FIG. 1 is a block diagram showing a prior art video signal reproducing system and FIG. 2 is a plan view of a rotary drum having a single video head to be used therein.

Referring to FIG. 1, the prior art video signal reproducing system comprises a rotary transformer 11, an amplifier 12, a signal processing circuit 23, a demodulator circuit 20, a clamp circuit 21, a synchronous separation circuit 22, a clamp circuit 45, an A/D converter 24, a memory unit 26, a memory unit control circuit 31, and a D/A converter 33. In FIG. 2, 3 denotes a rotary drum, 5 denotes a single video head and 2 denotes a video tape.

In the prior art VTR shown partly in FIG. 1, the single video head 5 reproduces a FM signal 13 shown in FIG. 3(d) from the video tape 2 by being switched (switcher is not shown) by a head switching signal 17 shown in FIG. 3(b). The reproduced FM signal 13 reproduced by the single video head 5 is demodulated at the demodulator circuit 20 into a video signal 43 having a signal field and a no-signal field, alternatively, as it is shown in FIG. 3(e). This video signal 43 is then fed to the clamp circuit 21 before applying to the synchronous separation circuit 22 for fixing a sync-tip level to a constant level. However, a time constant of the clamp circuit 21 has normally been selected to be 10 times as much as an interval of horizontal synchronizing signal, thereby generating sags in a clamped video signal 44 as shown in FIG. 3(f). Therefore, if such a clamped video signal 44 is fed to the A/D converter 24 for converting it into a digital signal and further a no-signal field thereof is supplemented with a video signal in the preceding signal field by utilizing the memory unit 26 and the memory unit control circuit 31, a resultant video signal 32 may have a sag in each field, as shown in FIG. 3(g), and be fed to the D/A converter 33 for converting it into a distorted analog signal.

Accordingly, there has been a problem of sag distortion that results in a considerable disturbance of display as it is hard to detect vertical and horizontal synchronizing pulses at the synchronous separation circuit 22 in the duration of the sags.

A skew distortion has also been encountered in the prior art VTR reproducing system such shown by a block diagram in FIG. 4. Referring to FIG. 4, a reproduced FM signal 13 reproduced from a head 5 is amplified at an amplifier 12 and fed to a switcher 18 which is operated by a switching signal 17. The reproduced FM signal 19 switched at the switcher 18 is then demodulated into a video signal 43 at a demodulator 20 and clamped to a certain level at the tip end of a synchronizing signal thereof in a clamp circuit 21. The clamped video signal 44 is fed to an A/D converter 24 and is digitized therein. The digitized video signal 25 is then fed to a memory unit 26.

A memory unit control circuit 31 starts writing the digitized signal 25 into the memory unit 26 from a start point WR in the signal field and the writing and the reading are repeatedly executed at a sampling rate in the duration of the signal field whilst the video signal written in the memory unit 26 in the duration of the preceding signal field is read out during the no-signal field starting from a start point RR. The video signal 32 read out from the memory unit 26 is fed to a D/A converter 33 for converting it into an analog signal to attain a reproduced video signal 34 shown in FIG. 5 (c) (shown only by a horizontal synchronizing signal).

Since the prior art system has been arranged as described above, if the reproduced video signal performs an interlace scanning, an interval of horizontal synchronizing pulses at the switch over point will become 1.5H as it is shown in FIG. 5(c), losing a continuity of the horizontal synchronizing signal and causing such a problem as skew distortion in every field.

Moreover, a phase distortion has been encountered in a reproduced video signal in accordance with the prior art VTR reproducing system, especially in a case when a recorded video signal is reproduced in a different speed from that of the recording.

Now referring to FIG. 6, there is shown a prior art rotary drum assembly in a cross section. The rotary drum assembly consists of a rotary shaft 1, a fixed lower drum 10, an upper rotary drum 3, a head bed 4 secured to the upper rotary drum 3 by screws, video heads 5 mounted at the periphery of the head bed 4 and shown together with a video tape 2, bearings 6, an upper rotary transformer 7 fixed to the upper rotary drum 3 to be rotated therewith, a stationary lower transformer 8, a pedestal 9 secured to the rotary shaft 1 to support the upper rotary drum 3, a magnet 75 mounted on the upper rotary drum 3 and a magnetic detector 76 arranged in proximity of the magnet 75 for detecting magnetic fluxes therefrom to determine a rotary position of the upper rotary drum 3.

The video heads 5 traverse across the video tape 2 in a slant-wise by the rotation thereof and the travel of video tape 2 for forming parallel tracks as it is shown in FIG. 7. Referring now to FIG. 7(a) through (d), there are shown several tracks formed by the relative movements of the rotary heads 5 and the video tape 2, wherein A2 designates a track of the traveling video tape 2, V1 designates a normal traveling speed of the video tape 2, A5 designates tracks of the rotary heads 5 and V designates a speed of the rotary heads 5. Since the track A2 and the tracks A5 are crossed as shown in the drawing, relative tracks to be formed on the traveling video tape 2 by the rotary heads 5 are represented by tracks A in FIG. 7(a). In a still display playback mode, the traveling speed of the video tape 2 is 0 and the relative tracks A0 conform to A5. In a slow motion display playback mode, the traveling speed of the video tape 2 is decreased from V1 to Vs and the relative tracks of the rotary heads 5 against the traveling video tape 2 are represented by As in FIG. 7(b).

In a VTR employing such a rotary drum assembly, as described above, a pseudo-vertical synchronizing signal for a reproduced video signal is generated with a constant phase relationship to a head switching signal in case of playing back a recorded video signal from the video tape 2 other than the normal traveling speed of V1 and combined to the reproduced video signal to form a composite video signal. However, in this type of play-back mode, the rotary heads 5 do not trace the relative tracks A or recorded tracks, which are formed on the video tape 2 at normal traveling speed by the rotary heads 5, and a signal output level is decreased considerably, then, over and above this, noises are generated due to off tracking of the rotary heads 5. Thus, it is hard to attain a clear display from the reproduced video signal because of a poor S/N ratio.

Heretofore, it has been proposed to utilize a rotary drum assembly having an arrangement to displace the rotary heads 5 so as to trace the recorded tracks accurately under any traveling speed of the video tape 2. The rotary drum assembly of this type is shown in FIG. 8 partly in a cross section. In this illustration, a drive unit 40 displaces the rotary heads 5 in the lateral direction of the video tape 2 upon receipt of a control signal from the outside through a slip-ring coupling composed of a contact 52 and a ring electrode 53. An amount of displacement of the rotary heads 5 is so selected, for instance, in the case of slow motion play-back mode with a tape traveling speed of Vs, so as to change the tracks A5 of the rotary heads 5 to be A51 within one field play-back period of time in order to make relative tracks coincide with the relative tracks A of the normal tape traveling speed as it is shown clearly in FIG. 7(c).

More generally, it is required to displace the displaceable rotary heads by an amount of $P(1-Vs/v)$ (where Vs/v is Vs/V1) in the duration of one field play-back period of time under any slow tape traveling speed of Vs to make the rotary heads trace the recorded tracks without deviation. If the tape traveling speed is decreased from V1 to V1/2, the same track may be traced a plurality of times by the rotary heads. In FIG. 7(d), there is shown an example wherein the video tape 2 is traveling at V1/2 and the rotary heads 5 are so displaced in the lateral direction of the video tape 2 as to align relative tracks with the relative tracks A for tracing the track A at the position of L0. In this example, a switching point of the rotary heads is given by So. In the next field, the tracing will be made on a track at the position of L1 which is parted from the previously traced track by an amount of P/2 and a switching point of the rotary heads will be given by S1 provided that the rotary heads are displaced so as to trace the track at L1. Accordingly, a phase difference between reproduced video signals derived from the tracks at the Lo and L1 is given by $\frac{1}{2} \cdot \alpha$ H based on the switching points of So and S1.

As it has been described above, in accordance with the prior art system, there has been a problem such that if a pseudo-vertical synchronizing signal generator circuit being capable of generating a pseudo-vertical synchronizing signal with a constant phase is employed for the reproduced video signal which has a different phase in every field, there may cause vertical vibrations or a jitter in the displayed pictures due to the fact that the phase difference between the inserted pseudo-vertical signal and the reproduced video signal varies by an amount of $\frac{1}{2}\alpha$ H for every trace (in the case of slow motion play-back with the tape traveling speed of V1/2).

It is therefore an object of the present invention to provide a VTR that can reproduce a stable image in good picture quality with no distortions by eliminating sags from the reproduced video signal.

It is an another object of the present invention to provide a VTR that can reproduce a stable image in good picture quality with no distortions by eliminating skews from the reproduced video signal.

It is still another object of present invention to provide a VTR that can produce a stable image in good picture quality with no distortions regardless of tape traveling speed by eliminating phase distortions due to use of a pseudo-vertical synchronizing signal generator being capable of generating a pseudo-vertical synchronizing signal having no phase shifting from the tape traveling speed.

SUMMARY OF THE PRESENT INVENTION

In accordance with the present invention, there is provided an improved video signal reproducer that can afford to reproduce a high quality video signal with no distortions in a VTR.

According to a first aspect of the present invention, a problem of sag distortion is solved by applying a continuous reproduced video signal with no field interval intermission to a clamp circuit for eliminating durations where a horizontal and a vertical synchronizing signals are not detected by a synchronous separation circuit. More specifically, the video signal reproducer in one preferred embodiment of the present invention includes a circuit for inserting a FM signal reproduced by a pair of rotary heads, which are mounted across a rotary drum besides a single rotary head, into a no-signal field interval of a FM signal being reproduced by the single rotary head, and a circuit for replacing the inserted signal with a demodulated video signal in the preceding signal field interval after demodulating the FM signals.

According to a second aspect of the present invention, a problem of skew distortion is solved by reading out a stored video signal from a memory unit under the control of a read control circuit in such a manner as to keep a continuity of horizontal synchronization by making a horizontal scanning period 1 H at the switch over point of a no-signal field interval and a signal field interval in the reproduced video signal for not causing synchronization disturbance thereat. More specifically, the video signal reproducer in another preferred mode of the present invention includes circuits wherein write/read of the reproduced video signal to/from the memory unit is carried out simultaneously during the signal field interval in synchronization with a horizontal synchronizing signal, while the reading of the video signal from the memory unit in the succeeding no-signal field interval is so controlled as to maintain the continuity of timing by providing a horizontal scanning period of 1 H from the last horizontal synchronizing pulse of the video signal in the preceding signal field interval.

According to a third aspect of the present invention, a problem of vertical synchronizing phase distortion is solved by inserting a pseudo-vertical synchronizing signal, which has a specific phase relationship with a video tape phase standard signal and is dependent upon a traveling speed of the video tape, into a reproduced video signal for eliminating the disturbance in the vertical synchronization. More specifically, the video signal reproducer in still another preferred embodiment of the present invention comprises a pseudo-vertical synchronizing signal generator being capable of generating the pseudo-vertical synchronizing signal, which has a specific phase relationship with the video tape phase standard signal regardless of the traveling speed of the video tape, based on a tape phase standard signal which is recorded on the video tape within a frame period, rotation pulses which stand for a rotational speed of a capstan or an amount of traveling of the video tape and a head switching signal.

BRIEF DESCRIPTION OF THE DRAWINGS

FIGS. 7a-d are a schematic diagram showing the relationship between the recorded tracks on the video tape and the scanning tracks by the rotary heads;

FIG. 9 is a block diagram showing the total arrangement of the video signal reproducer for use in a VTR embodying the present invention;

FIGS. 12a-g are a timing diagram showing the waveforms at the various parts of the embodiment of this invention shown in FIG. 10;

FIGS. 14a-g are a timing diagram showing the waveforms at the various parts of the embodiment of this invention shown in FIG. 13;

FIGS. 15a-e are a timing diagram showing the write/read timing at the memory unit in the block diagram of FIG. 13;

FIGS. 19a-d are a timing diagram showing the pseudo-vertical synchronizing signal timing in the generator circuit of FIG. 18.

DESCRIPTION OF THE PREFERRED EMBODIMENTS

Figure 1:
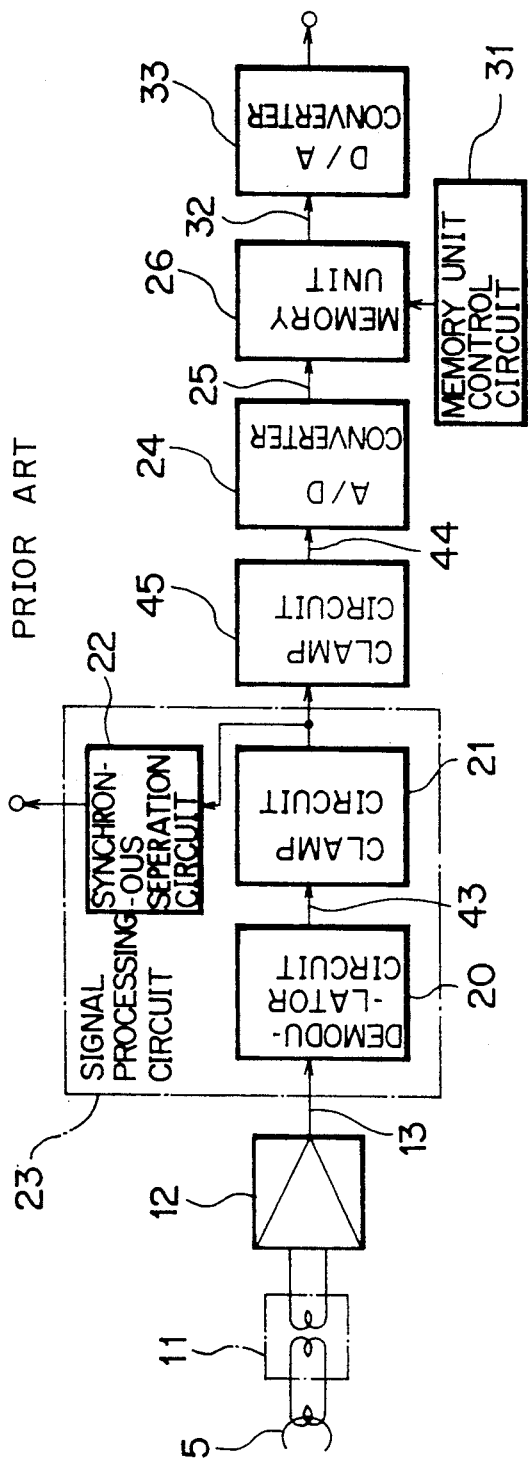
FIG. 1 is a block diagram of a known video signal reproducer for use in a VTR.
Figure 2:
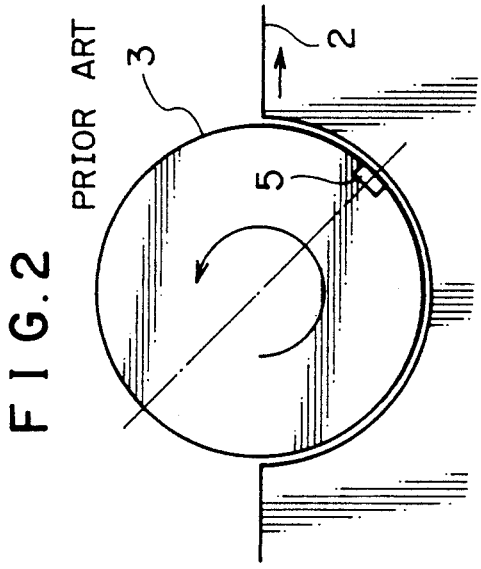
FIG. 2 is a plan view of a known configuration of a rotary head drum.
Figure 3:
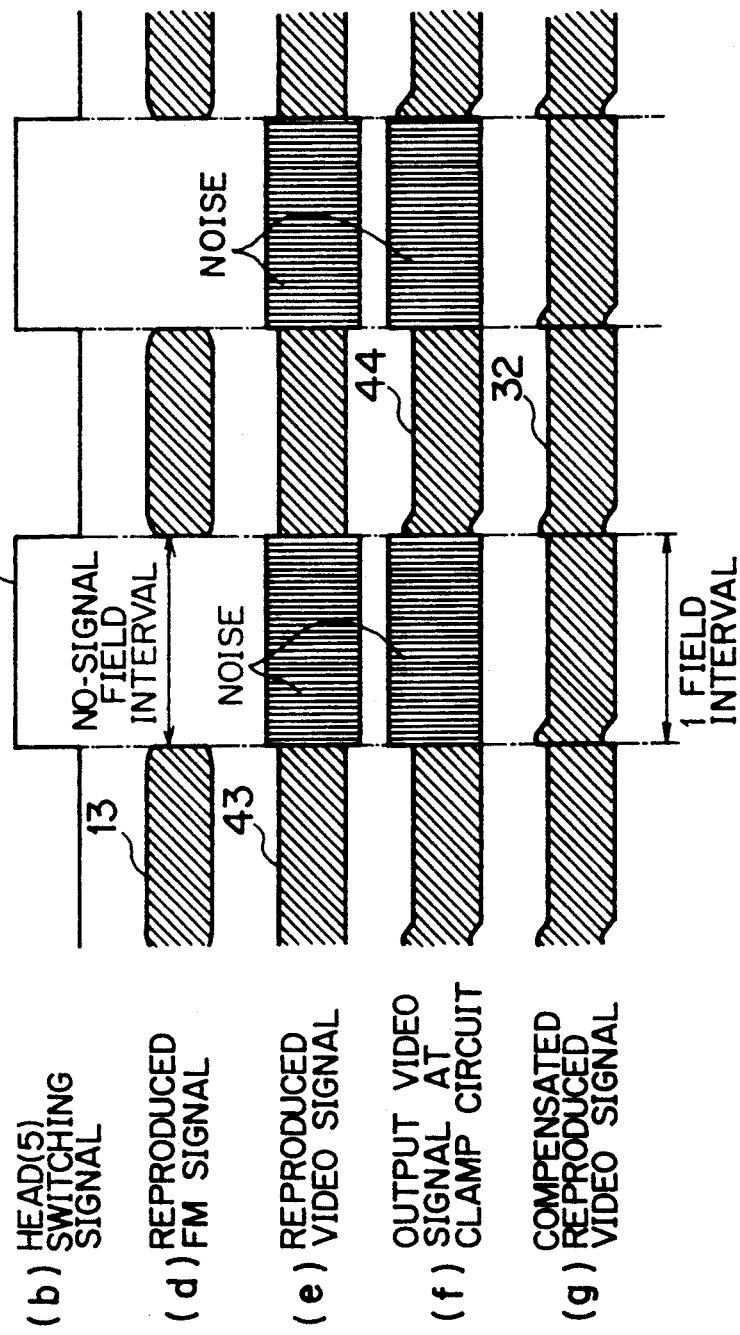
FIGS. 3b-g are a timing diagram showing the waveforms at various parts of in the block diagram of FIG. 1.
Figure 4:
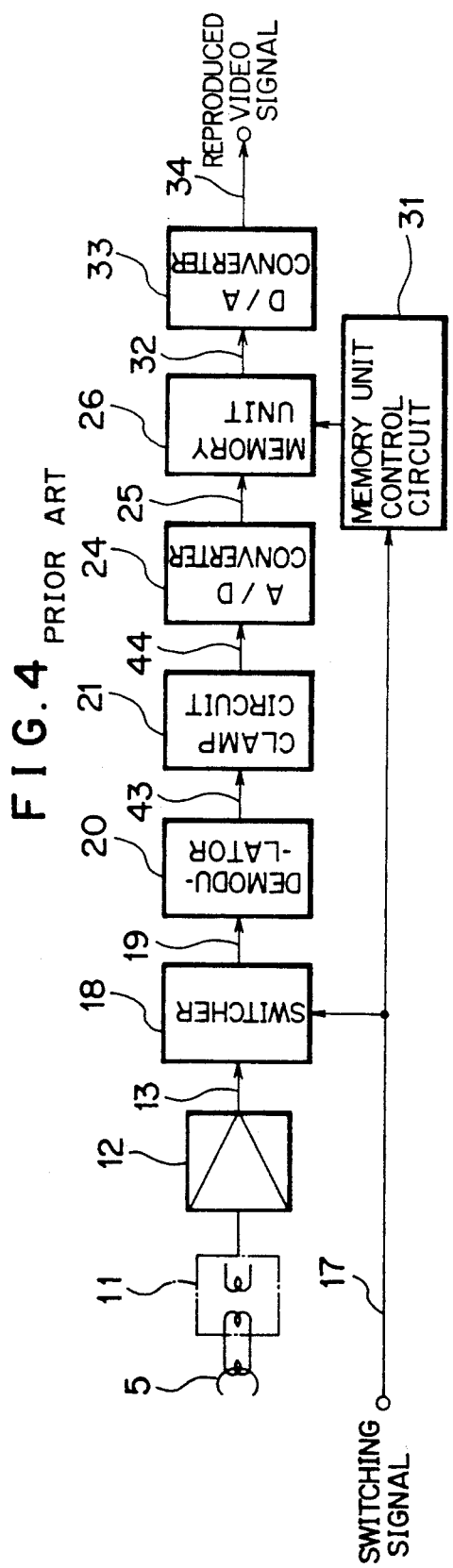
FIG. 4 is a block diagram of a known video signal reproducer for use in a VTR.
Figure 5:
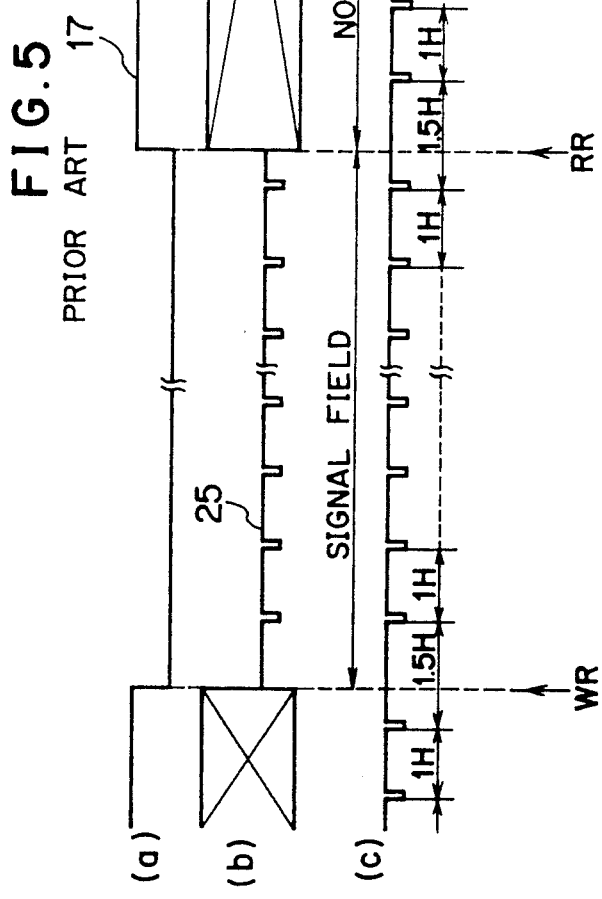
FIGS. 5a-c are a timing diagram showing the write/read timing at the memory unit in the block diagram of FIG. 4.
Figure 6:
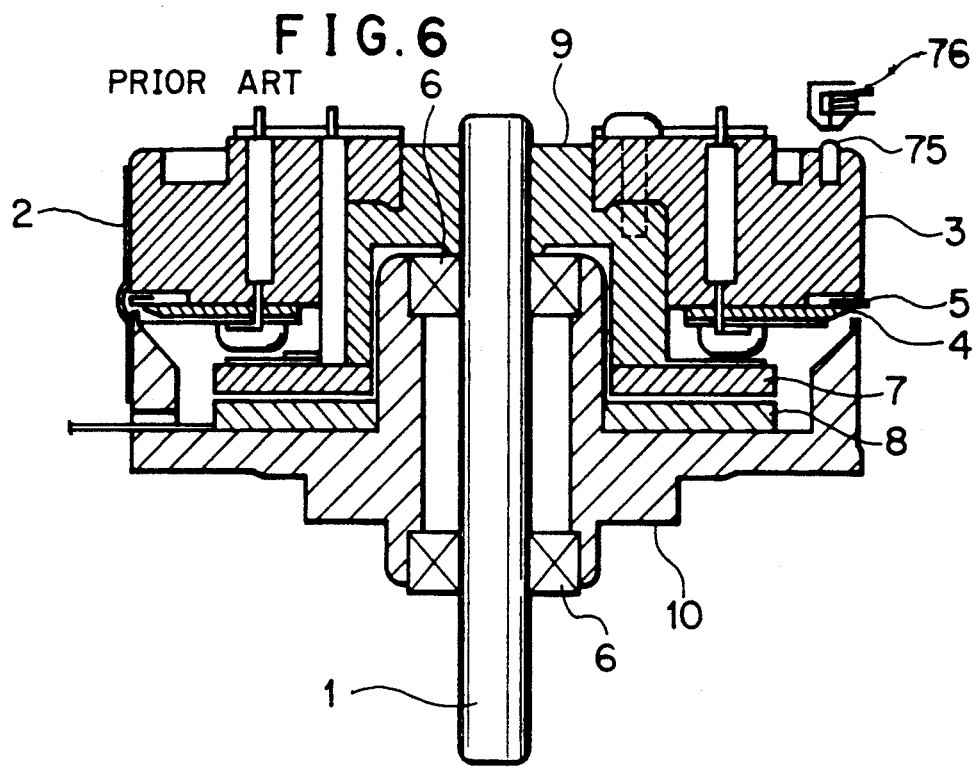
FIG. 6 is a sectional view of a known rotary head drum.
Figure 8:
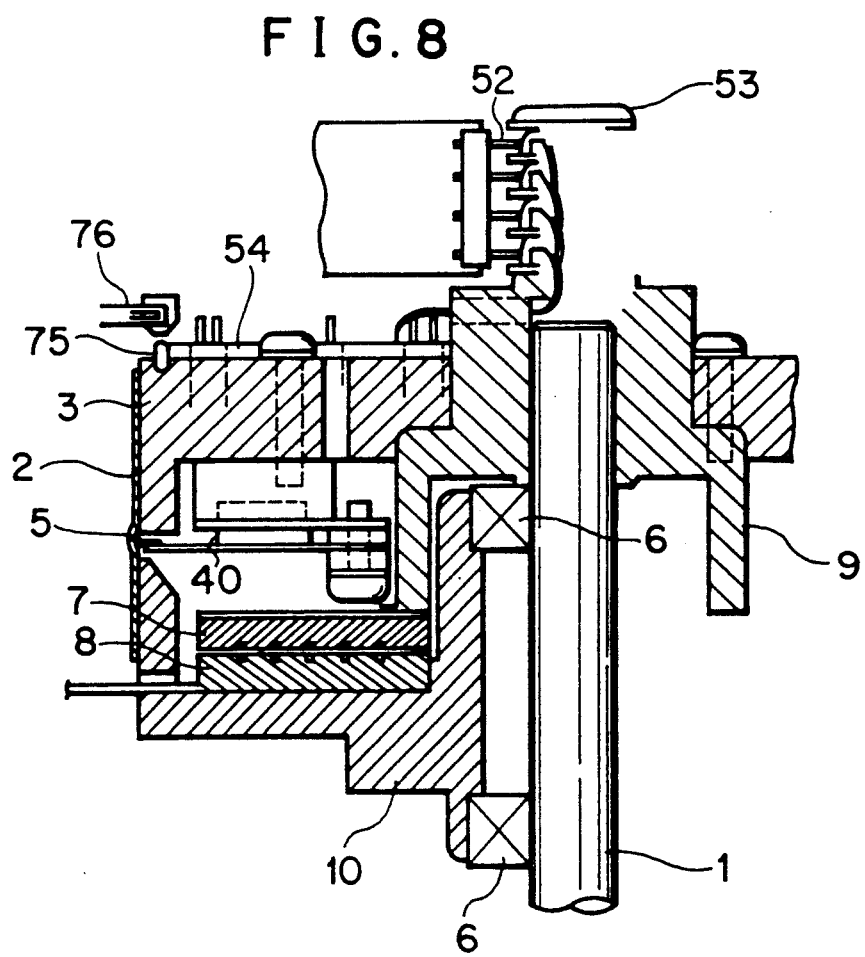
FIG. 8 is a sectional view of a rotary head drum of the type having displaceable rotary heads.
Figure 10:
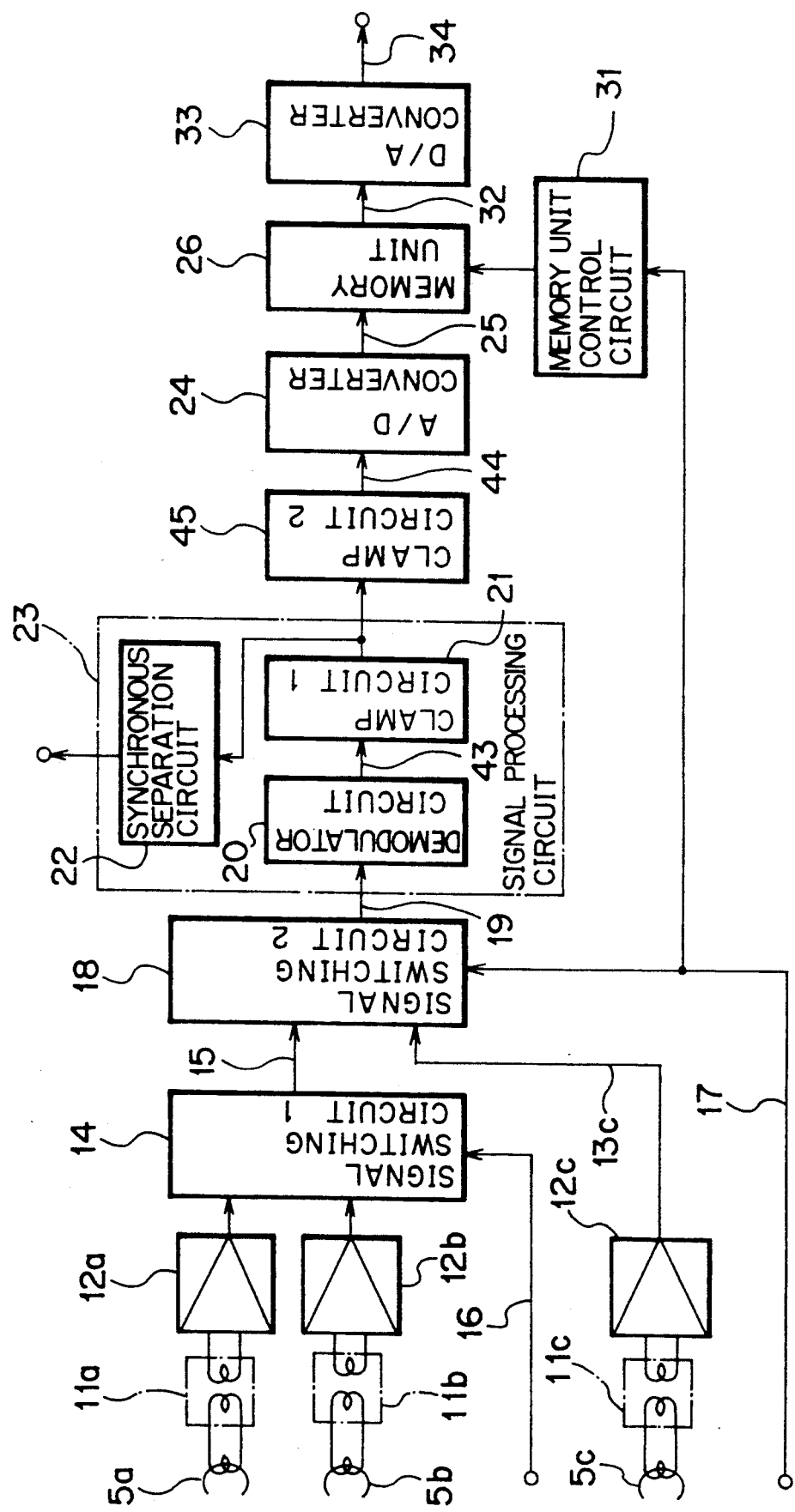
FIG. 10 is a block diagram showing a preferred embodiment of this invention.
Figure 11:
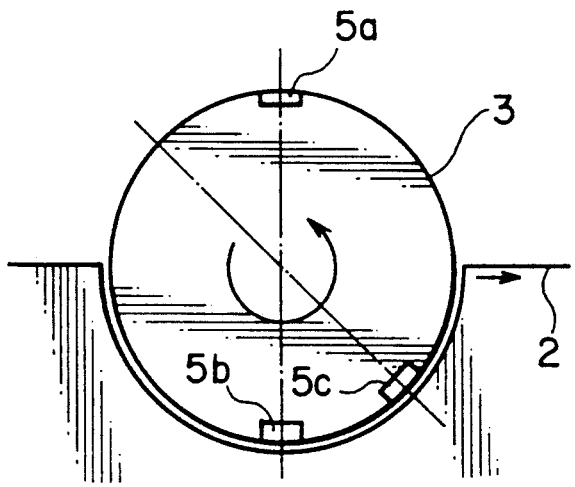
FIG. 11 is a plan view of the rotary head drum to be used in the embodiment of this invention shown in FIG. 10.

Preferred embodiments of the present invention will now be described more in detail with reference to the accompanying drawings. In the several figures like reference numerals identify like elements. Referring first to FIG. 9, there is shown the total arrangement of the video signal reproducer fragmentarily shown in FIG. 10, FIG. 13, FIG. 16, FIG. 17 and FIG. 18 for use in a rotary head type VTR. The detailed description will be made with reference to the respective drawings hereinafter. The first embodiment of the present invention will now be described with reference to FIGS. 10 through 12, numerals 5a and 5b denote a pair of rotary heads mounted across a rotary drum 3 and numeral 5c denotes a single rotary head mounted on the same rotary drum 3. Picked up signals at each rotary head 5a, 5b and 5c are fed respectively to video amplifiers 12a, 12b and 12c through rotary transformers 11a, 11b and 11c. The reproduced FM signal 13c, shown in FIG. 12(d), is fed to a signal switching circuit (2) 18 after being amplified at the video amplifier 12c while the reproduced FM signals from the pair of rotary heads 5a, 5b are fed to a signal switching circuit (1) after being amplified at the video amplifiers 12a and 12b. The signal switching circuit (1) 14 is switched by a switching signal 16 shown in FIG. 12(a) and derives a reproduced FM signal 15 shown in FIG. 12(c) therefrom. The reproduced FM signal 15 is then fed to the signal switching circuit (2) 18 together with the reproduced FM signal 13c. The signal switching circuit (2) 18 is switched by a switching signal 17 shown in FIG. 12(b) and derives a continuous reproduced FM signal 19 shown in FIG. 12(e) therefrom for supplying a continuous signal to a signal processing circuit 23.

The reproduced FM signal 19 is demodulated into a video signal at a demodulator 20 and fed to a clamp circuit (1) 21 as a reproduced video signal 43 for clamping. The clamped video signal is fed to an A/D converter 24 as a video signal 44 shown in FIG. 12(f) being clamped to an input level of the A/D converter 24 through another clamp circuit (2) 45. The video signal 44 is digitized into a digital signal 25 at the A/D converter 23 and fed to a memory unit 26.

A memory unit control circuit 31 controls the sending out of the video signal reproduced by the rotary head 5c in the duration of signal field interval while writing it into the memory unit 26 and to replace in turn the video signal reproduced by the pair of rotary heads 5a and 5b in the duration of no-signal field interval with the stored video signal in the preceding signal field interval by reading it from the memory unit 26. In this way, the replaced video signal 32, all of which is reproduced by the rotary head 5c as it is shown in FIG. 12(g), is converted into an analog signal by a D/A converter 33 and is derived therefrom as a video signal 34.

As seen, in accordance with this embodiment of the invention, since the video signal 43 to be fed to the clamp circuit 21 is a continuous signal, there are no sags in the video signal that passes through the clamp circuit 21. Therefore, there are no intervals in the video signal at which the vertical and horizontal synchronizing signals can not be separated from the video signal in the synchronous separation circuit 22. Accordingly, there is no disturbance in display.

Further, in the embodiment of the invention described above, there is mounted one pair of rotary heads 5a, 5b across the rotary drum 3 besides the independent single head 5c, however, this is not limited to one pair of rotary heads but a plurality of pairs of rotary heads may be mounted on the rotary drum for the same purpose.

Still further, there is shown the independent single rotary head 5c which is fixed to the rotary drum 3 in the above described embodiment of the present invention, however, the fixed rotary head 5c may be substituted by a displaceable rotary head in order to trace recorded tracks under any tape traveling speed by displacing the rotary head in the lateral direction of the video tape.

Figure 13:
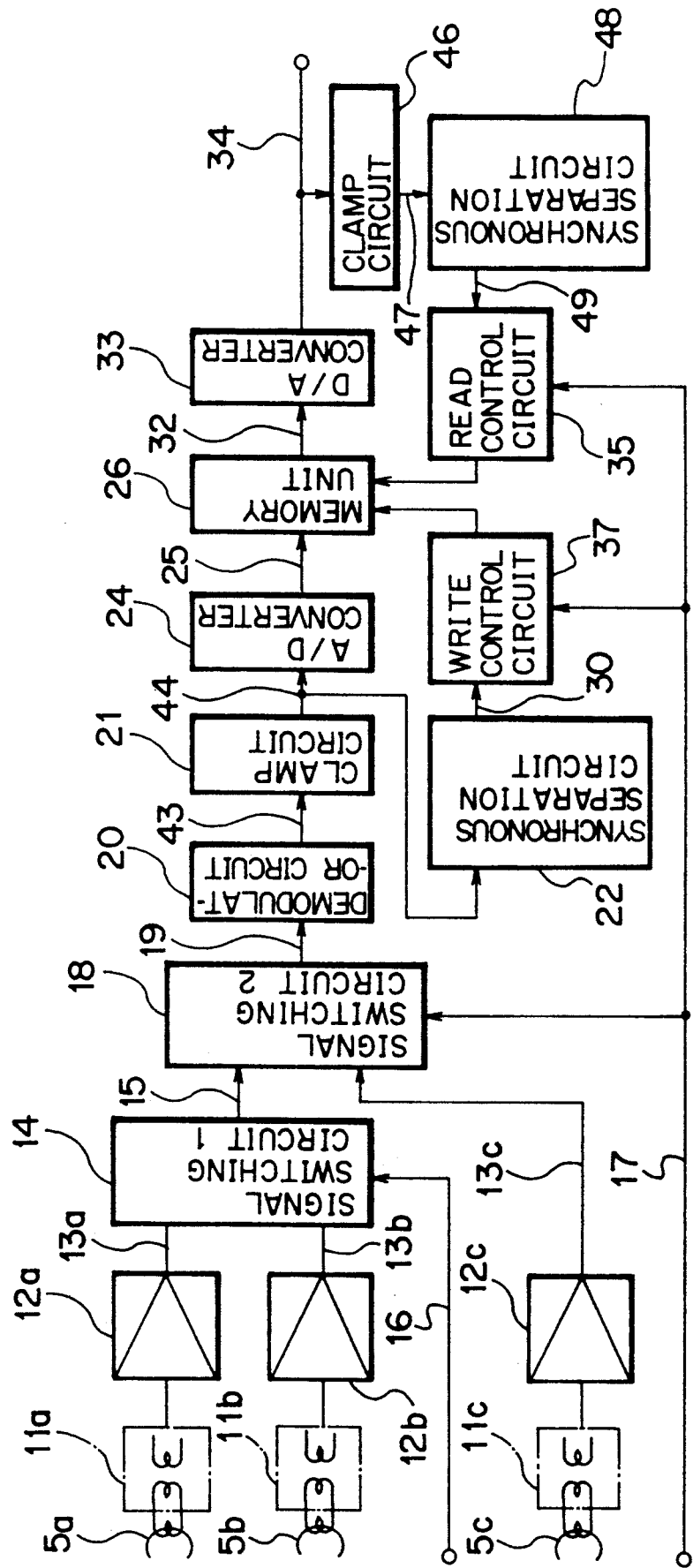
FIG. 13 is a block diagram showing another preferred embodiment of this invention.
Figure 17:
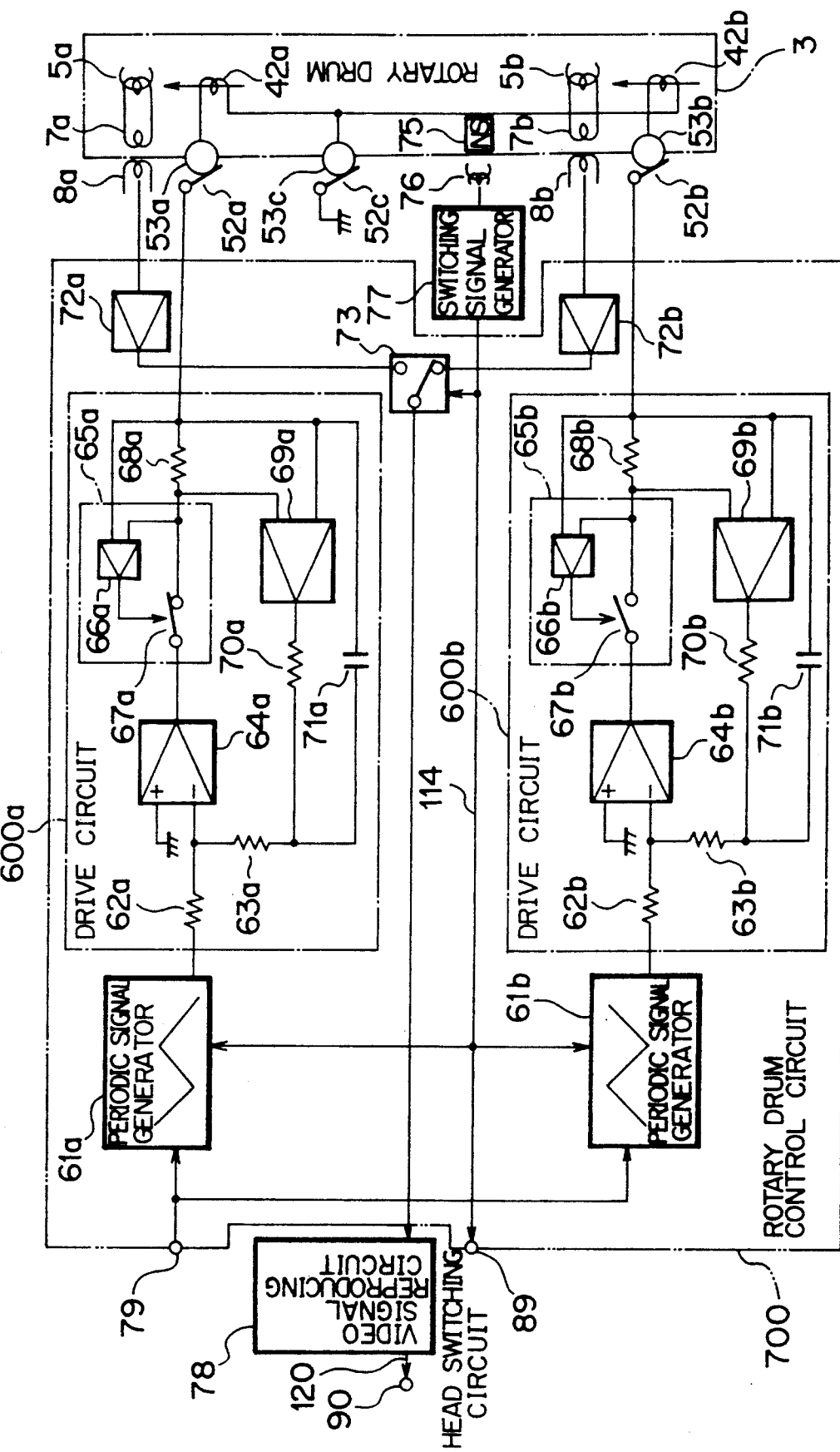
FIG. 17 is a block diagram showing the rotary head drum control circuit in the embodiment of this invention shown in FIG. 16.

Another preferred embodiment of the invention will be described with reference to the drawings of FIG. 13 through FIG. 15. Referring to FIG. 13, like reference numerals identify like elements in the foregoing, wherein 22 denotes a first synchronous separation circuit, 35 denotes a read control circuit, 37 denotes a write control circuit for the memory unit 26, 46 denotes a second clamp circuit and 48 denotes a second synchronous separation circuit.

In operation, a reproduced FM signal 13c reproduced by a single rotary head 5c and amplified by an amplifier 12c shown in FIG. 14(d) is fed to a signal switching circuit (2) 18 and reproduced FM signals 13a, 13b reproduced by a pair of rotary heads 5a, 5b and amplified by amplifiers 12a, 12b are fed to a signal switching circuit (1) 14 for being switched by a switching signal 16 shown in FIG. 14(a) to yield a continuous signal which is shown as a reproduced FM signal 15 in FIG. 14(c). The reproduced FM signal 15 is then fed to the signal switching circuit (2) 18 together with the reproduced FM signal 13c. The signal switching circuit (2) 18 is switched by a switching signal 17 shown in FIG. 14(b) to derive a reproduced FM signal 19 shown in FIG. 14(e) therefrom by inserting the reproduced FM signal 15 into a no-signal field interval of the reproduced FM signal 13c. This reproduced FM signal 19 is demodulated into a video signal 43 shown in FIG. 14(f) by a demodulator 20 and then fed to a clamp circuit 21 for clamping a tip end level of the synchronizing signal to a predetermined level. In this case, since the reproduced video signal 43 is a continuous signal, there are no sags even after passing through the clamp circuit 21.

The clamped video signal 44 is fed to the synchronous separation circuit 22 as well as an A/D converter 24. Consequently, a synchronizing signal 30 separated from the video signal 44 at the synchronous separation circuit 22 is fed to the write control circuit 37 and a video signal 25 digitized at the A/D converter 24 is fed to a memory unit 26.

Referring now to FIG. 15, the write control circuit 37 discriminates a signal field interval and no-signal field interval of the reproduced FM signal 13c based on a switching signal 17 shown in FIG. 15(a) and controls writing into the memory unit 26 to start with a point WR in FIG. 15 in synchronized with the first horizontal synchronizing pulse 50 in the signal field interval as it is shown in FIG. 15. The writing and reading are repeated with a repetition rate of sampling in a duration of write/read interval W/R.

A video signal 32 being read from the memory unit 26 is converted into an analog video signal 34 by a D/A converter 33 and fed to the clamp circuit 46 for clamping a tip level of the synchronizing signal thereof to a predetermined level. The synchronizing signal 49 separated from the clamped video signal 47 at the synchronous separation circuit 48 is then fed to the read control circuit 35. The read control circuit 35 discriminates the signal field interval and the no-signal field interval basing on the switching signal 17 and controls reading of the stored video signal in the preceding signal field from the memory unit 26 to start with a point RR in FIG. 15 which is exactly 1 H period apart from the last horizontal synchronizing pulse shown at a point LH in FIG. 15 in the signal field interval. The reading is continued in a duration of read interval R.

Accordingly, the reproduced video signal 34 attained by the above described write/read control can maintain the continuity of the horizontal synchronizing signal such as 1 H period at the boundary of the signal field interval and the no-signal field interval regardless of a type of scanning of the reproduced video signal 43 whether or not the scanning is interlaced as it is shown in FIG. 15(c) and there provided is a display with no disturbance in the synchronization.

Figure 16:
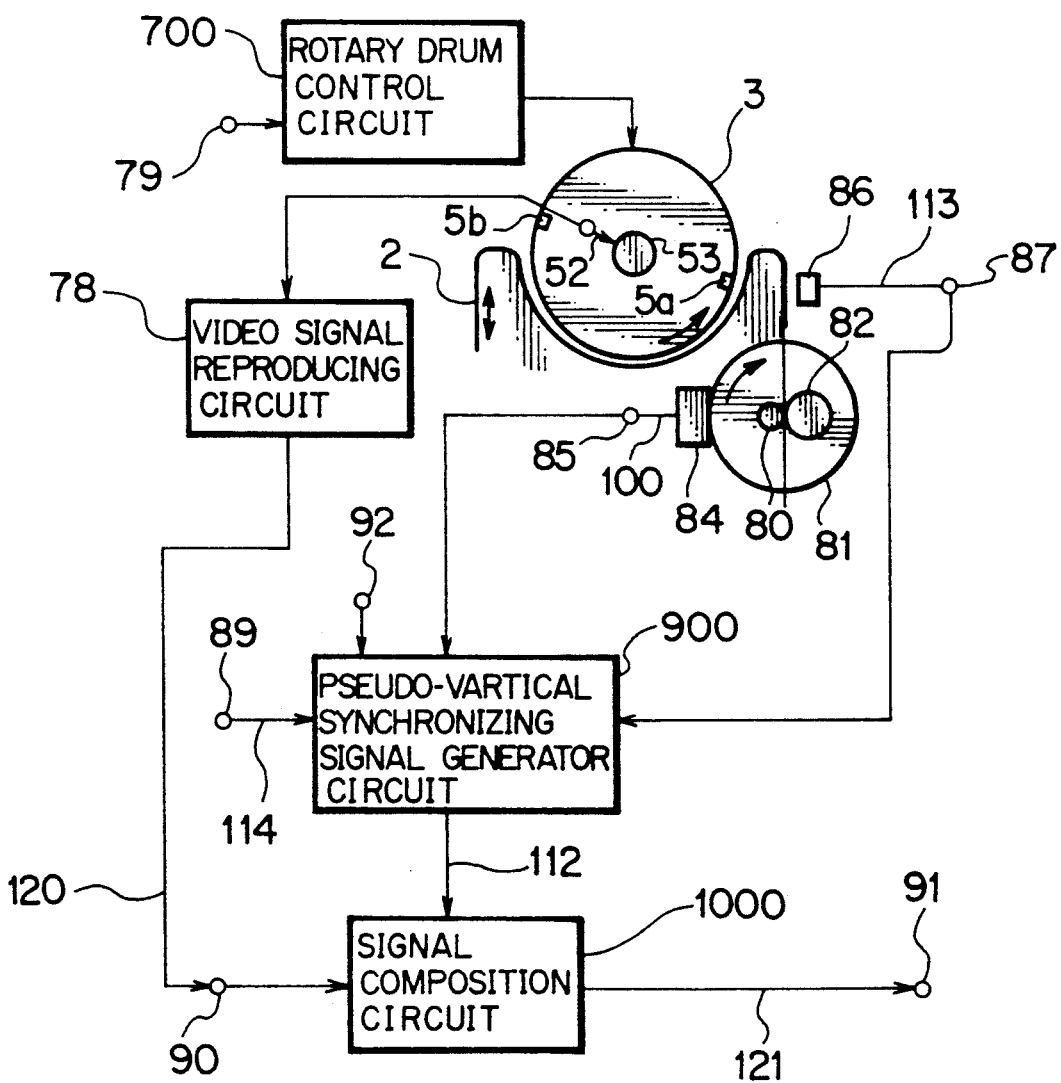
FIG. 16 is a block diagram showing still another preferred embodiment of this invention.

Still another preferred embodiment of the invention will be described with reference to FIG. 16 through FIG. 19 wherein like numerals designate like elements in the foregoing. Referring first to FIG. 16, there is shown a schematic diagram of this embodiment of the invention in block from, wherein 5a and 5b denote displaceable rotary heads mounted across a rotary drum 3, 700 denotes a rotary drum control circuit, 79 denotes an input for an adjusting signal to adjust a range of the rotary heads displacement, 78 denotes a video signal reproducing circuit for deriving a reproduced video signal 120 from an output terminal 90 thereof, 80 denotes a capstan for driving a magnetic video tape 2 to travel cooperatively with a pinch roller 82 pressed thereto, 81 denotes a capstan motor, 84 denotes a rotary pulse generator arranged in parallel with the capstan motor 81 for deriving rotary pulses 100 from an output terminal 85 thereof and 86 denotes a tape phase standard signal generator arranged in contact with the traveling magnetic video tape 2 for deriving a tape phase standard signal 113, which has been recorded on the magnetic video tape with a frame period, from an output 87 thereof. A pseudo-vertical synchronizing signal generator 900 generates a pseudo-vertical synchronizing signal 112 in such a phase as being related to the tape phase standard signal of the traveling magnetic tape 2.

A signal composition circuit 1000 combines the reproduced video signal 120 with the pseudo-vertical signal 112 for deriving a composite video signal 121 from an output terminal 91 thereof. Now referring to FIG. 17, there is shown a detailed block diagram of the rotary drum control circuit 700 in accordance with the embodiment of the invention shown in FIG. 16, wherein 61a and 61b denote periodic signal generators for generating periodic signals which differs 180 degrees in phase under the control of a switching signal 114. The switching signal 114 is generated by a switching signal generator 77 by detecting a mechanical position of the rotary drum 3 with use of a permanent magnet 75 mounted on the rotary drum 3 and a position detecting head 76. Outputs of the periodic signal generators 61a and 62 b are fed to drive circuits 600a and 600b each of which is composed of an operational amplifier 64, a differential amplifier 69, an electric current limiter 65, resistors 62, 63, 68 and 70, and a capacitor 71. Outputs of the drive circuits 600a, 600b or control currents for the displaceable rotary heads 5a, 5b are fed to drive coils 42a, 42b of the drive unit 40 through respective contacts 52a, 52b and electrodes 53a, 53b. Non-control side terminals of the drive coils 42a, 42b are connected in common and then connected to a standard potential through a pair of common electrodes 53c and contacts 52c.

Magnetic fields to be generated by the drive coils 42a, 42b when the control currents flow therethrough displace the displaceable rotary heads 5a, 5b respectively by developing a magnetic repulsion against each cylindrical permanent magnet that constitutes the drive unit 40. An amount of the displacement is controlled in such a manner that head tracing tracks A5 in the play-back conform to recorded tracks on the video tape 2. The control currents are also fed to the drive coils 42a, 42b while the rotary heads 5a, 5b are not in contact with the video tape 2. Playback signals by the rotary heads 5a, 5b are fed to head amplifiers 72a, 72b through upper and lower transformers 7, 8 and outputs of the head amplifiers 72a, 72b are fed in turn to the video signal reproducing circuit 78 for deriving a reproduced video signal 120 therefrom after being switched by a switch 73 under the control of a swiching signal 114.

Operation of the drive circuits 600a, 600b will now be described more in detail. Since the drive circuit 600a and the drive circuit 600b are the same in structure and operate in the same manner with 180 degrees phase difference, the description will be made only for the drive circuit 600a.

In accordance with this embodiment of the invention, there provided are such condition as that (resistance of the resistor 63)>(resistance of the resistor 70), and (impendance of the capacitor 71)>(resistance of the drive coil 42). The drive circuit 600a has two feed back loops, one of which is a current feed back via the differential amplifier 69 which detects and feeds back a voltage across the resistor 68 (proportional to the drive current that flows through the drive coil 42a) interposed in the control line while the other of which is a voltage feed back loop via the capacitor 71.

When a frequency of the periodic signal is high, an impedance of the capacitor 71 approaches to 0 and the voltage feed back loop gets control over the current feed back loop, resulting in the voltage drive operation. On the other hand, when a frequency of the periodic signal is low, an impedance of the capacitor 71 approaches ∞ and the current feed back loop gets control over the voltage feed back loop, resulting in the current drive operation. The relationship between a fundamental drive frequency for the rotary head 5a, which rotates simultaneously with the drive coil 42a, and a mechanical resonance frequency of the drive unit 40 is given by an inequality of (fundamental drive frequency)<(mechanical resonance frequency). Hence, the current drive operation is performed at least in the vicinity of the fundamental drive frequency whilst the voltage drive operation is performed for a short-circuit control at least in the vicinity of the mechanical resonance frequency.

Further, in order to eliminate a difference in gains at the times of the voltage drive operation and the current drive operation, the following circuit constants are selected in this embodiment of the invention:

$$\frac{\text{(gain of the differential}}{\text{amplifier 69)}} = \frac{\text{(resistance of the drive coil 42a)}}{\text{(resistance of the resistor 68)}}$$

The electric current limiter 65 which is composed of a window comparator 66 and a current limiting element 67 detects a voltage across the resistor 68 (proportional to a current that flows through the drive coil 42a) and limits a control current to make the displacement of the displaceable rotary head 5a to fulfill an inequality of [|required speed−1|×track pitch P<displace limit<structural displace limit of the displaceable rotary head 5a]. That is, the electric current limiter 65 and the differential amplifier for current feed back are operated simultaneously with a voltage across the resistor 68.

Operation of the pseudo-vertical synchronizing signal generator circuit 900 will be described more specifically with reference to FIG. 18. A number of rotary pulses 100 of the capstan motor 81 is proportional to a rotary angle of the capstan 80 and consequently to an mount of traveling of the magnetic video tape 2. The rotary pulses 100 and the tape phase standard signal 113 detected from the traveling magnetic video tape 2 through the tape phase standard signal detector 86 are fed to a tape phase detector 101 for counting the rotary pulses 100 by initializing the counting periodically with the tape phase standard signal 113. Therefore, an output of the tape phase detector 101 or a tape phase data 102 has a value proportional to the phase of the traveling magnetic video tape 2.

The tape phase data 102 is latched at a latch circuit 103 with an edge pulse 116 of the head switching signal 114 being detected by an edge detector 115 and the latched tape phase data 104 is then fed to a processor 105. The processor 105 executes the following process:

$$\frac{\text{(latched tape phase data 104)}}{\text{(maximum value of tape phase data 102)}} \times 2\alpha H$$

and derives a processed data 106 therefrom.

A delay unit 117 delays the edge pulse 116 and derives a delayed edge pulse 110 after a certain time Tc. A pseudo-vertical synchronizing signal timing generator circuit 107 accepts the processed data 106 from the processor 105 when the delayed edge pulse 110 is fed thereto and counts down the accepted processed data 106 upon receipt of every clock pulse 119 for deriving a borrow signal 108 therefrom upon reaching 0 in counting. A generation timing of the borrow signal 108 becomes a generation start timing of the pseudo-vertical synchronizing signal 112 to be generated by a pulse generator 109. The borrow signal 108 is assured a pulse width as a vertical signal by the pulse generator 109 and taken out as the pseudo-vertical synchronizing signal 112.

Figure 18:
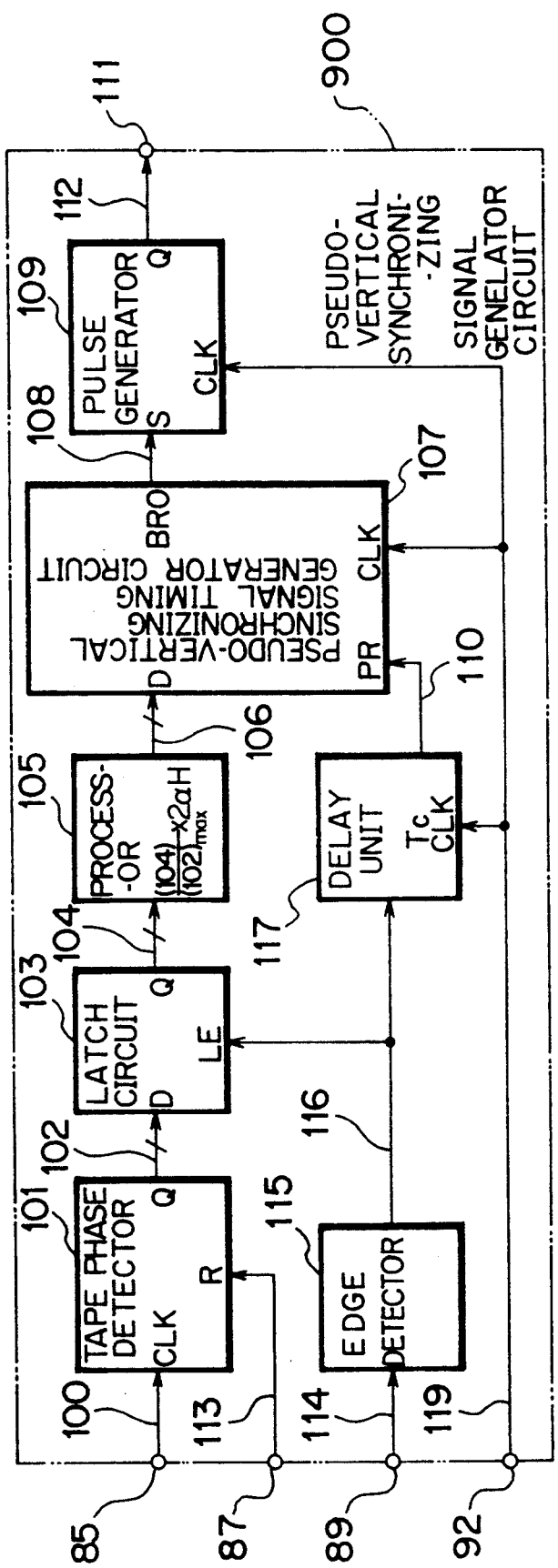
FIG. 18 is a block diagram showing the pseudo-vertical synchronizing signal generator circuit in the embodiment of this invention shown in FIG. 16.

Referring to FIG. 19, FIG. 19 is a timing chart for the waveforms at various parts of the embodiment of the invention shown in FIG. 18 in the mode of V1/2 speed slow-motion playback illustrating the relationship amongst the head switching signal 114, the tape phase standard signal 113, the tape phase data 102, the latched tape phase data 104 and the pseudo-vertical synchronizing signal 112. In the case of V1/2 speed slow-motion playback, one period of the tape phase standard signal 113 corresponds to two periods of the head switching signal 114.

Since the tape phase data 102 is attained by counting the rotary pulses 100 from the capstan as being initialized periodically by the tape phase standard signal 113, the wave form of the tape phase data 102 (D/A converted) is given by a solid line in FIG. 19(c). Further, the wave form of the latched tape phase data 104 latched by the both edges of the head switching signal 114 is given by a dotted line in FIG. 19(c).

A time T of the pseudo-vertical synchronizing signal 112 from the switch over point of the rotary heads is given by:

$$T = Tc + \frac{\text{(tape phase data 104)}}{\text{(maximum value of tape phase data 102)}} \times 2\alpha H$$

where Tc is the delay time given by the delay unit 117.

As it has been described above, the pseudo-vertical synchronizing signal is generated with such a phase as being related to the tape speed to be combined with the reproduced video signal. There is provided a VTR which can display a stable image with no jitter under any tape traveling speed that includes not only a slower but a faster traveling speed than the normal tape traveling speed V1 because of the fact that the phase of the pseudo-vertical synchronizing signal can always be maintained in constant with respect to that of the reproduced video signal in accordance with this specific embodiment of the invention.

In the foregoing specification, the invention has been described with reference to the specific embodiments thereof, it will, however, be evident that various modifications and changes may be made thereunto without departing from the scope of the invention as set forth in the appended claims. The specification and the drawings are, accordingly, to be regarded in an illustrative rather than in a restrictive sense.

What is claimed is:

1. A video tape recorder comprising:
   a rotary drum, said rotary drum having mounted thereon displaceable rotary heads to be driven in a direction lateral to a magnetic video tape, said displaceable rotary heads tracing playback tracks that conform to recorded tracks on the magnetic video tape at any traveling speed thereof, said displaceable rotary heads producing playback signals from tracing the magnetic videotape;
   video signal reproducing means for producing a video signal from the playback signals produced by said displaceable rotary heads;
   a clock circuit for producing clock signals;
   rotary pulse generating means for generating rotary pulses, said rotary pulses being generated according to revolutions of a capstan motor;
   first means for detecting a phase signal recorded on the magnetic video tape within a frame period;
   second means for counting said rotary pulses to generate tape phase data, said second means beginning the counting process in response to said phase signal;
   latch means for latching said tape phase data with an edge pulse derived from a head switching signal;
   processor means for processing the latched tape phase data;
   pseudo-vertical synchronizing signal timing means for receiving the processed tape phase data in response to a delayed edge pulse attained by delaying the edge pulse by certain amount of time, for counting down the processed tape phase data in response to said clock signal, and for deriving therefrom a borrow signal upon reaching a count equal to zero;
   a pulse generator circuit for generating a pseudo-vertical synchronizing signal in response to said borrow signal; and
   signal composition means for producing a composite video signal by combining said pseudo-vertical synchronizing signal with the produced video signal from the video signal reproducing means.

* * * * *